US006829075B1

(12) United States Patent
Kosc et al.

(10) Patent No.: US 6,829,075 B1
(45) Date of Patent: Dec. 7, 2004

(54) ELECTRICALLY ADDRESSABLE OPTICAL DEVICES USING A SYSTEM OF COMPOSITE LAYERED FLAKES SUSPENDED IN A FLUID HOST TO OBTAIN ANGULARLY DEPENDENT OPTICAL EFFECTS

(75) Inventors: Tanya Z. Kosc, Rochester, NY (US); Kenneth L. Marshall, Henrietta, NY (US); Stephen D. Jacobs, Pittsford, NY (US)

(73) Assignee: The University of Rochester, Rochester, NY (US)

( * ) Notice: Subject to any disclaimer, the term of this patent is extended or adjusted under 35 U.S.C. 154(b) by 0 days.

(21) Appl. No.: 10/441,453

(22) Filed: May 20, 2003

(51) Int. Cl.[7] ................................................. G02F 1/13
(52) U.S. Cl. ......................... 359/272; 359/273; 349/16
(58) Field of Search ................................ 359/272, 265, 359/273, 274, 296, 321; 349/16, 13, 86, 115, 166, 182–186

(56) References Cited

U.S. PATENT DOCUMENTS

| | | |
|---|---|---|
| 3,406,363 A | 10/1968 | Tate |
| 3,668,106 A | 6/1972 | Ota |
| 3,841,732 A | 10/1974 | Marks |
| 3,967,265 A | 6/1976 | Jacob |
| 4,076,387 A | 2/1978 | Haas et al. |
| 4,126,528 A | 11/1978 | Chiang |
| 4,126,854 A | 11/1978 | Sheridon |
| 4,143,103 A | 3/1979 | Sheridon |
| 4,168,986 A | 9/1979 | Venis, Jr. |
| 4,270,841 A | 6/1981 | Saxe |
| 4,285,801 A | 8/1981 | Chiang |
| 4,298,448 A | 11/1981 | Miller et al. |
| 4,305,807 A | 12/1981 | Somlyody |
| 4,311,361 A | 1/1982 | Somlyody |
| 4,657,349 A | 4/1987 | Labes et al. |
| 4,680,103 A | 7/1987 | Beilin et al. |
| 4,688,900 A | 8/1987 | Doane et al. |
| 4,707,080 A | 11/1987 | Fergason |
| 4,919,521 A | 4/1990 | Tada et al. |
| 5,059,245 A | 10/1991 | Phillips et al. |
| 5,279,657 A | 1/1994 | Phillips et al. |
| 5,344,594 A | 9/1994 | Sheridon |
| 5,364,557 A | 11/1994 | Faris et al. |
| 5,380,362 A | 1/1995 | Schubert |

(List continued on next page.)

FOREIGN PATENT DOCUMENTS

| | | |
|---|---|---|
| GB | 2276883 | 10/1994 |
| WO | WO 01/88607 A1 | 11/2001 |

OTHER PUBLICATIONS

D. Cairnes et al., SID Digest of Technical Papers, XXX, 725–728 (1999).

(List continued on next page.)

Primary Examiner—Scott J. Sugarman
Assistant Examiner—Richard Hanig
(74) Attorney, Agent, or Firm—Kenneth J. Lukacher; Martin Lukacher

(57) ABSTRACT

Composite or layered flakes having a plurality of layers of different materials, which may be dielectric materials, conductive materials, or liquid crystalline materials suspended in a fluid host and subjected to an electric field, provide optical effects dependent upon the angle or orientation of the flakes in the applied electric field. The optical effects depend upon the composition and thickness of the layers, producing reflectance, interference, additive and/or subtractive color effects. The composition of layered flakes may also be selected to enhance and/or alter the dielectric properties of flakes, whereby flake motion in an electric field is also enhanced and/or altered. The devices are useful as active electro-optical displays, polarizers, filters, light modulators, and wherever controllable polarizing, reflecting and transmissive optical properties are desired.

15 Claims, 2 Drawing Sheets

U.S. PATENT DOCUMENTS

| | | | |
|---|---|---|---|
| 5,389,945 A | 2/1995 | Sheridon et al. | |
| 5,523,863 A | 6/1996 | Fergason | |
| 5,571,624 A | 11/1996 | Phillips et al. | |
| 5,587,242 A | 12/1996 | Hou et al. | |
| 5,650,872 A | 7/1997 | Saxe et al. | |
| 5,672,410 A | 9/1997 | Miekka et al. | |
| 5,691,789 A | 11/1997 | Li | |
| 5,691,795 A | 11/1997 | Doane et al. | |
| 5,708,525 A | 1/1998 | Sheridon | |
| 5,717,283 A | 2/1998 | Biegelsen et al. | |
| 5,717,514 A | 2/1998 | Sheridon | |
| 5,737,115 A | 4/1998 | Mackinlay et al. | |
| 5,739,801 A | 4/1998 | Sheridon | |
| 5,751,268 A | 5/1998 | Sheridon | |
| 5,754,332 A | 5/1998 | Crowley | |
| 5,760,761 A | 6/1998 | Sheridon | |
| 5,766,738 A | 6/1998 | Phillips et al. | |
| 5,767,826 A | 6/1998 | Sheridon et al. | |
| 5,825,529 A | 10/1998 | Crowley | |
| 5,851,604 A | 12/1998 | Muller-Rees et al. | |
| 5,940,150 A * | 8/1999 | Faris et al. | 349/16 |
| 5,961,804 A | 10/1999 | Jacobson et al. | |
| 6,017,584 A | 1/2000 | Albert et al. | |
| 6,034,753 A * | 3/2000 | Li et al. | 349/98 |
| 6,133,980 A * | 10/2000 | Faris | 349/176 |
| 6,291,065 B1 | 9/2001 | Poetsch et al. | |
| 6,392,785 B1 | 5/2002 | Albert et al. | |
| 6,394,595 B1 * | 5/2002 | Jiang et al. | 347/101 |
| 6,422,687 B1 | 7/2002 | Jacobson | |
| 6,445,490 B1 | 9/2002 | Chopra et al. | |
| 6,497,942 B2 | 12/2002 | Sheridon et al. | |
| 6,498,674 B1 | 12/2002 | Sheridon | |
| 6,515,649 B1 | 2/2003 | Albert et al. | |
| 6,665,042 B1 * | 12/2003 | Marshall et al. | 349/166 |
| 2002/0033117 A1 | 3/2002 | Inoue et al. | |

OTHER PUBLICATIONS

E. Korenic et al., Mol. Cryst. Liq. Cryst. 317, 197–219 (1998).

Kosc, Tanya et al., Electric–field–induced motion of polymer cholesteric liquid–crystal flakes in a moderately conductive fluid, Applied Optics, vol. 41, No. 25, pp. 5362–5366 (2002).

Srinivasan, U. et al., MEMS: Some Self–Assembly Required, Optics & Photonics News, pp. 21–24 (Nov. 2002).

Branham, Micheal et al., Rapid Communications: Rapid prototyping of micropatterned substrates using conventional laser printers, J. Mater. Res., vol. 17, No. 7, pp. 1559–1562 (2002).

Kumar, A. et al., Features of gold having micrometer to centimeter dimensions can be formed through a combination of stamping with an elastomeric stamp and an alkanethiol "ink" followed by chemical etching, Appl. Phys. Lett. vol. 63, No. 14, pp. 2002–2004 (1993).

* cited by examiner

PLC
dielectric metal
PLC or dielectric

PLC or dielectric
metal
dielectric or PLC metal — dielectric or PLC

ELECTRICALLY ADDRESSABLE OPTICAL DEVICES USING A SYSTEM OF COMPOSITE LAYERED FLAKES SUSPENDED IN A FLUID HOST TO OBTAIN ANGULARLY DEPENDENT OPTICAL EFFECTS

The present invention relates to optical devices having electrically addressable composite layered flakes with angularly dependent optical properties in a system including the flakes and a host fluid. The composite flakes have a plurality of layers of different materials, such as dielectric, conductive and polymer liquid crystalline materials. The optical properties are electrically selectable or addressable by an electric field applied toward the flake/host system.

Reference may be made to the following patent documents which describe optical devices containing flake/host systems that rely on polymer liquid crystal (PLC) flakes to provide angularly dependent optical effects: U.S. patent application Ser. No. 09/571,805, filed May 16, 2002 and published in International Publication WO 01/88607, published Nov. 22, 2001, now U.S. Pat. No. 6,665,042, issued Dec. 16, 2003; and U.S. patent application Ser. No. 10/405,163, filed Apr. 2, 2003 by Tanya Z. Kosc, Kenneth L. Marshall, and Stephen D. Jacobs. Both of these patent documents are incorporated herein by reference.

Particles of various materials have been used, principally in devices relying on electrophoretic effects, in order to provide electrically switchable optical devices. These particles are generally all dielectric and do not rely on composite layers to obtain optical effects or to enhance particle motion as is the case with devices of the present invention. Reference may be made to the following U.S. Patents for further information regarding such prior devices: Labes, U.S. Pat. No. 4,657,349, issued Apr. 14, 1987; Albert, U.S. Pat. No. 6,392,785, issued May 21, 2002; Jacobson, U.S. Pat. No. 6,422,687, issued Jul. 23, 2002; Sheridon, U.S. Pat. No. 6,497,942, issued Dec. 24, 2002; and Albert, U.S. Pat. No. 6,515,649 issued Feb. 4, 2003. Other devices similar to those in the referenced patents, as well as other documents that describe them, are referenced in the above-identified International Publication.

It has been discovered in accordance with the invention that composite or layered flakes that have heretofore been used exclusively as paint and ink pigments and have angularly dependent optical properties, can be selected or addressed by an electric field when contained in a flake/host system.

The composite flakes used in a flake/host system in accordance with the invention may include both dielectric and conductive layers. The dielectric layers may include, but are not limited to, materials such as mica, titanium dioxide, rutile, aluminum oxide, silica, magnesium fluoride, polymers, Mylar (polytetrafluorethylene), cellophane, polyester, and polyethylene and polymer liquid crystals (PLC's). Metals such as gold, silver, aluminum, tin, and metal oxides such as tin oxide or indium tin oxide may be used as the conductive layer, but the conductive layer is not limited to these materials.

The angularly dependent optical properties may be obtained in several ways: (1) one or more of the layers can be liquid crystalline; (2) two or more layers can reflect light, causing optical interference effects as determined by the index of refraction and the thickness of the layers; (3) one or more layers can contain holograms; (4) any combination of these methods can be used.

Though angularly dependent optical effects are often desired, there are conditions in which it is preferable to suppress or alter the angular dependence. This suppression of angular dependence can be achieved by preparing composite flakes with a specifically colored layer, such as a dyed polymer, coated with a layer having angularly dependent optical properties, such as a liquid crystal, and utilizing additive and/or subtractive color effects. The composite flake reflects a specific color when it is illuminated and viewed normally. However when the composite flake is viewed off-axis, the constant color reflecting from the bottom layer compensates for the shifting color being reflected from the top liquid crystalline layer, minimizing the change/shift in apparent color. A specifically colored bottom layer in a composite flake is not limited to suppression of angle-dependent color effects. Specific color combinations can also alter, intensify, and enhance color dependent effects.

A composite flake may also serve to manipulate the effects of circular polarization that are obtained when polymer cholesteric liquid crystal (PCLC) layers are used. PCLC's have an inherent optical property known as selective reflection that causes a PCLC layer to reflect only light of a specific wavelength (color) and circular polarization (right- or left-handed). The ability to provide polarized light is highly desirable for many applications, particularly those employing three-dimensional effects or tagging for security features. Because selective reflection only reflects one handedness of light, the opposite handedness, or 50% of the light, is not utilized. In applications where brightness of the reflecting layer is a primary concern, it would be useful to manufacture composite flakes possessing two layers of PCLC, with each layer reflecting one of the two polarizations of light, thus maximizing flake reflectivity.

The use of a metallic layer may be two fold. In certain inks and pigments, the metallic layer is required to produce the desired optical effect, particularly for "pearl luster" or "pearlescent" pigments. When a metallic layer is included in the slack (composition) of layers in a composite flake, it will change the dielectric properties of the flakes. Since the metallic layer is conductive, it significantly alters flake behavior when an electric field is applied.

The plurality of layers in composite flakes can be dielectric and can be composed of two or more layers. For example, dielectric layers can be used to "sandwich" a metal oxide layer or a metal layer. One or more of those dielectric layers may be a PLC (either a PCLC, a polymer nematic liquid crystal, or a polymer smectic liquid crystal). The flakes may be produced by the methods described in the examples that appear below.

Various commercial pigments may be used to provide the composite flakes. Some of such pigments and their manufacturers are listed in the following table. In the table, "pearl luster" thin film pigments are the traditional pigments based on mica platelets coated with aluminium or bronze layers whose thickness determines the color of the interference effect. "Multiple layer" thin film pigments refer to pigments that use multiple layers (typically dielectric) for interference effects.

| Manufacturer | Flake/pigment/ink |
| --- | --- |
| Eckart | Stapa metallic pigment |
| Silberline | Silvet, Sivex metallic pigment |
| Engelhard | Mearlin, Bi-Lite, Chroma-Lite, thin film "pearl luster" pigment Cellini, organic thin film "pearl luster" pigment |
| Merck | Iriodin, Bi-flair "pearl luster" thin film pigment |
| | Xirallic coated aluminum oxide pigment |
| | Colorstream transparent silica pigment |

-continued

| Manufacturer | Flake/pigment/ink |
|---|---|
| Flex Products Inc. | Chromoaflair "multiple layer" thin film pigment |
| BASF AG | Paliocrom, "pearl luster" thin film pigment Variochrom "multiple layer" thin film pigment, holographic pigments (to be introduced) |
| PPG Industries | Geometric Pigments ™ holographic pigments |
| Wacker-Chemie AG | Helicone liquid crystal pigments |
| Eckart-Werke | Alucolor, Aloxal aluminum coated with color pigments and coated with $SiO_2$ |
| Toyo Aluminium with Nissin Steel Co., Ltd. & Nippon Sheet Glass Co., Ltd. | Metashine, CrystalStar metallized glass flakes |

In addition, the following United States Patents describe composites of layered flakes for pigments used in paint and ink: Venis, U.S. Pat. No. 4,168,986, issued Sep. 25, 1979; Phillips et al., U.S. Pat. No. 5,279,657, issued Jan. 18, 1994, Phillips et al., U.S. Pat. No. 5,571,624, Issued Nov. 5, 1996; Hou et al., U.S. Pat. No. 5,587,242, issued Dec. 24, 1996; Miekka et al., U.S. Pat. No. 5,672,410, issued Sep. 30, 1997; Phillips et al., U.S. Pat. No. 5,766,738, issued Jun. 16, 1998. Pigments using PCLC and other layers appear in Muller-Rees et al., U.S. Pat. No. 5,851,604, issued Dec. 22, 1998; Poetsch et al., U.S. Pat. No. 6,291,065, issued Sep. 18, 2001; U.S. Patent Application Publication, Inoue et al., U.S. 2002/0033117, published, Mar. 21, 2002. The foregoing patents also describe methods of making the composite layered flakes.

The foregoing and other features and advantages of the invention will become more apparent from the following description and the accompanying drawing in which.

Figure 1A:
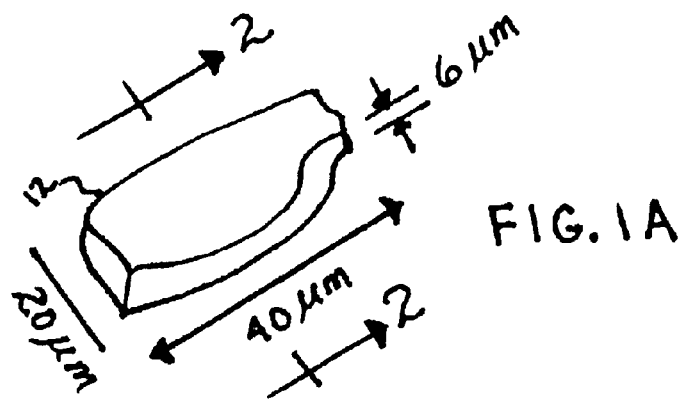
FIG. 1A is a perspective view of a typical irregularly shaped flake which is usable in a flake/host system of an optical device provided by the invention, particularly in a cell containing the system as shown in FIGS. 1B and 1C.
Figure 1B:
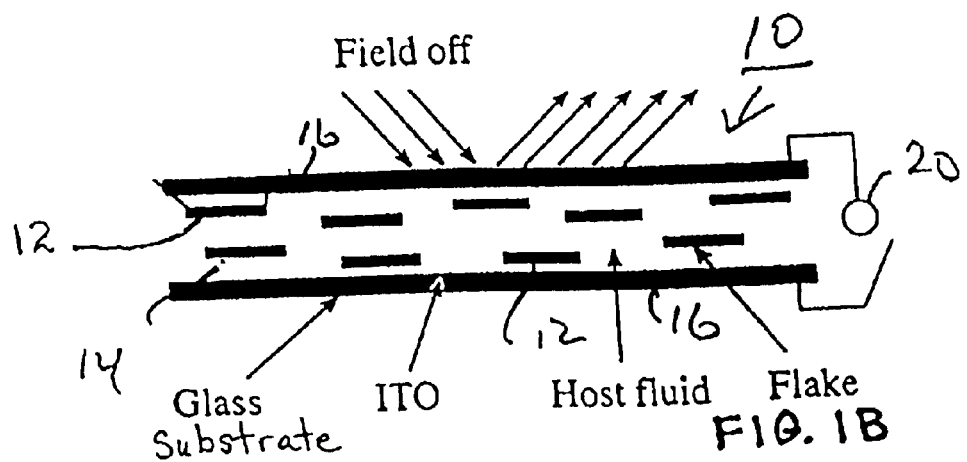
FIG. 1B is a schematic diagram of a cell incorporating the flake/host system wherein the flakes lie approximately parallel to the cell substrates or walls as occurs when no electric field is applied.
Figure 1C:
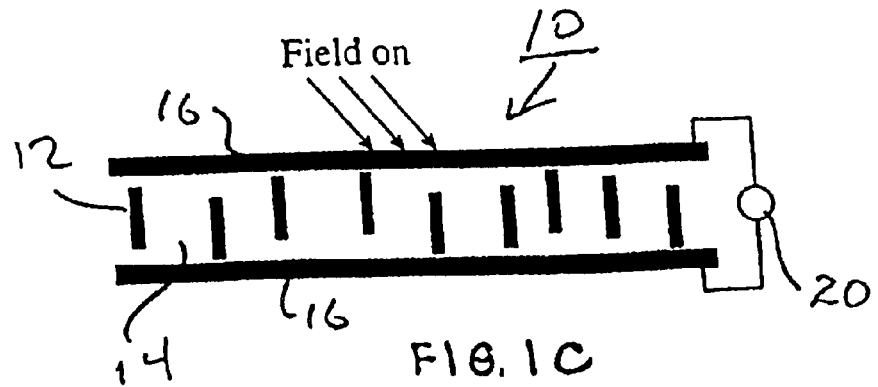
FIG. 1C is a view similar to FIG. 1B that shows the flakes reoriented with their long axis parallel to a field that is applied perpendicular to the substrates.

Referring to FIGS. 1A–1C, the basic device 10 embodying the invention represents a cell having a suspension of PCLC flake 12 in host fluid 14, which provides a flake/host system. Specific examples of such a host fluid that is used when conductivity is desired are propylene carbonate or poly(ethylene glycol). Silicone oils provide an essential nonconductive host fluid.

A typical device is constructed using an indium tin oxide (ITO) coated glass substrate 16 (in contact with the suspension), though a flexible polymer substrate can also be used. Uniform cell gaps between the substrates 16 may be set by spacers (e.g. beads, fibers, or gaskets), and the device 10 may be filled with the flake/host fluid suspension 14 using capillary action. The device 10 may be driven with either a DC or an AC electric field, whereby any periodic waveform can be used as an AC driving field. Waveform bursts or DC spikes may be used prior to or following the main driving waveform to help control or alter flake behavior. The details of device construction were already disclosed in the above-referenced U.S. Patent Applications and International Publication.

PCLC flakes 12 in the flake/host fluid system respond to electric fields by rotating about one axis, most commonly that which is parallel to the longest flake dimension. A typical flake 12 is shown in FIG. 1A. Flakes lying in the plane defined by the substrate reflect brightly (FIG. 1B), but once they reorient perpendicular to the substrate, little light is reflected (FIG. 1C).

The preferred host fluid in cases where the flakes are highly dielectric (not conductive) is a moderately conductive host fluid such as propylene carbonate or poly(ethylene glycol). When the flakes contain a conductive layer, then a highly insulating host fluid such as silicone oil is preferred. Reference may be made to the following examples for making different flake designs:

EXAMPLE 1

Figure 2A:
FIGS. 2A–2D are sectional views showing composite flakes having different arrangements of layers of different types and materials, the views being taken along the line 2—2 in FIG. 1A.

A flake having a two layer cross-section shown in FIG. 2A may include a polymer liquid crystal (PLC) thin film deposited onto a silicon substrate via knife coating, spin coating, dip coating or other coating technologies known to those skilled in the art. A dielectric layer is deposited onto the existing PLC layer so that the thickness of both layers totals 5–7 $\mu$m.

For depositing dielectric layers on the order of nanometers, techniques such as electron beam deposition, chemical vapor deposition, sputter-coating, or dip-coating may be used. For depositing dielectric layers on the order of micrometers, techniques such as dip-coating, knife-coating or spin-coating may be used. Dielectric layers in both cases may be deposited using other additional techniques know to those skilled in the art.

The dielectric layer is composed of a material or materials selected from a group of inorganic materials including but not limited to mica, titanium dioxide (rutile), aluminum oxide, silica, and magnesium fluoride or a group of organic polymers including but not limited to Mylar, cellophane, polyester, and polyethylene.

Liquid nitrogen is poured over the composite film, and the film fractures due to the large difference in the thermal expansion coefficients of the silicon wafer and the PLC film. The flakes are collected by rinsing them off of the substrates and into a storage container with a chemically compatible solvent such as methanol, which can be either evaporated or retained for storage.

EXAMPLE 2

A flake having the two-layer design shown in FIG. 2A with a total thickness of 5–7 $\mu$m may be created using patterning techniques such as the flexible mold substrate described in U.S. patent application Ser. No. 10/383,603, filed Mar. 7, 2003, by Anka Trajkovska-Petkoska et al. The PLC material and the mold substrate are heated to a temperature at which the PLC material is soft and sufficiently fluid to be pushed into the wells. Alternatively the PLC can be dissolved in a solvent such as methylene chloride or toluene and poured into the wells, and further processing is continued once the solvent has evaporated.

A dielectric layer on the order of tens or hundreds of nanometers thick composed of a material or materials selected from a group of inorganic or a group of organic polymers is deposited onto the existing PLC layer as described in Example 1. Alternately, a dielectric layer on the order of micrometers is deposited into the wells and onto the existing PLC layer in a similar manner that the PLC layer is deposited.

The flakes are released by flexing the mold substrate so that each flake falls out of its well and into a collection container. Loose flakes may also be washed off a substrate with a chemically compatible solvent and stored for further use.

EXAMPLE 3

Flakes having the design shown in FIG. 2A may be produced by depositing a 3–5 µm thin PLC layer onto an existing dielectric layer consisting of a material selected from a group of inorganic materials including but not limited to mica, titanium dioxide (rutile), aluminum oxide, silica, and magnesium fluoride or a group of organic polymers including but not limited to Mylar, cellophane, polyester, and polyethylene. The dielectric layer can be deposited onto a preexisting substrate such as a silicon wafer, or it can be deposited into wells for a mold substrate. The product flakes after forming are collected as described in previous Examples 1 and 2.

EXAMPLE 4

Figure 2B:

Flakes having the design shown in FIG. 2B may be produced by depositing a 5–7 µm PCLC layer onto a silicone substrate as described in Example 1 or the PLC is deposited into wells of a mold substrate as described in Example 2. A conductive layer (gold, silver, aluminum, tin, etc) on the order of tens or hundreds of Angstroms is deposited onto the existing PLC layer using techniques such as electron beam deposition, chemical vapor deposition, sputter-coating, or additional coating techniques known to those skilled in the art. The flakes are produced, or released as described in Examples 1 and 2 respectively.

EXAMPLE 5

Figure 2C:

Flakes having the design shown in FIG. 2C may be produced by depositing a 3–4 µm PCLC layer and a 10–100 nm conductive layer onto a substrate by means described in Example 4. A final 2–3 µm layer of PCLC is deposited by procedures described in Examples 1 or 2 so that the composite flake resembles a sandwich, wherein a thin conductive layer is found between two PCLC layers.

EXAMPLE 6

Figure 2D:
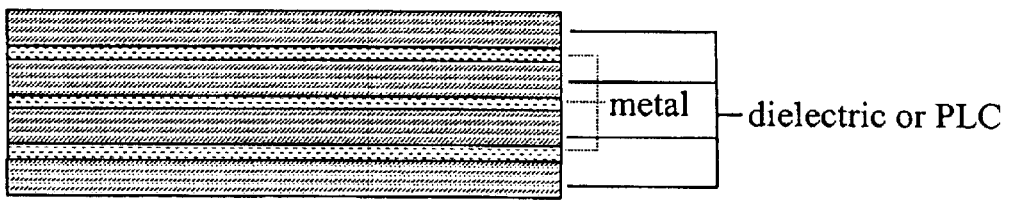

The flakes having the design shown in FIG. 2D are prepared in the same way as in Example 5, except multiple layers that may be either conductive or dielectric are applied to produce a flake with three or more layers.

EXAMPLE 7

The PCLC layers in Examples 1–6 may alternately be either polymer nematic liquid crystals or polymer smectic liquid crystals.

EXAMPLE 8

The PCLC layers in Examples 1–6 may be an type of dielectric layer composed of a material or materials selected from a group of inorganic materials including but not limited to mica, titanium dioxide (rutile), aluminum oxide, silica, and magnesium fluoride or a group of organic polymers including but not limited to Mylar, cellophane, polyester, and polyethylene.

EXAMPLE 9

The dielectric layers contained in Examples 1–6 and Example 8 are doped with a dye such as Oil Red-O to alter the optical properties of the dielectric layer. This construction is particularly suitable for obtaining color compensation effects as discussed above.

EXAMPLE 10

The dielectric layers contained in Examples 1–6 and Example 8 are doped with nanoscale particles such as titania to alter the dielectric properties of the dielectric layer.

EXAMPLE 11

Flakes having the design shown in FIG. 2A are processed to have a bottom layer that is a red colored dielectric (absorbs blue and green light, while reflecting red) and a top layer that is a PCLC with selective reflection in the red. The flake remains highly dielectric and must thus be suspended in a moderately conductive host fluid like propylene carbonate so that the flakes will reorient 90° when an AC electric field is applied. In the initial "off" state, the flake brightly reflects red light. Once the electric field is applied and the flake starts to reorient, the selective reflection color from the top surface shifts from red to green. The green reflected light is mixed with the red light reflecting from the bottom layer, thereby producing an additive color of orange and mitigating the color shift that would normally be seen with red PCLC flakes.

EXAMPLE 12

Flakes having the design shown in FIG. 2D or flakes such as the Chroma-lite pigments produced by Engelhard Corp., which have dielectric thin film layers and at least one conductive layer, are suspended in a highly dielectric host fluid such as silicone oil. A DC electric field is applied, causing the flakes to reorient 90° and a color shift in the reflected light.

EXAMPLE 13

Flakes having the design shown in FIG. 2C are processed to have a bottom layer that is a PCLC that reflects right-handed circularly polarized light and a bottom layer that is a PCLC that reflects left-handed circularly polarized light, with a conductive layer sandwiched between them. The resulting flakes are suspended in a highly dielectric host fluid such as silicone oil and can be reoriented using a DC electric field. The reflectivity of the device is nearly doubled because both right- and left-handed circularly polarized light is reflected.

From the foregoing description, it will be apparent that there has been provided dielectric devices which have features in addition to those of the above referenced applications. Variations and modifications in the described devices, within the scope of the invention will undoubtedly become apparent to those skilled in the art. The foregoing description should be taken as illustrative and not limiting, and Examples 11–13 provide a few possible ways to utilize composite flakes suspended in a host fluid and driven by an electric field.

What is claimed is:

1. An optical device comprising a system of flakes suspended in a fluid host, said flakes being composites of a plurality of layers providing angularly dependent optical properties by combination of light reflected from the layers, and said flakes having an angular orientation dependent upon an electric field to which said system is subjected.

2. The device according to claim 1 wherein said combination of reflected light from the layers produces an interference effect.

3. The device according to claim 1 wherein said combination of reflected light from the layers produces an additive or subtractive color effect.

4. The device according to claim 1 wherein one of said layers is conductive and said host is a non-conductive (highly dielectric) liquid.

5. The device according to claim 4 wherein said liquid host is silicone oil.

6. The device according to claim 1 wherein said layers are of dielectric material and said host is a liquid more conductive than said flakes.

7. The device according to claim 6 wherein said host liquid is selected from propylene carbonate and poly (ethylene glycol).

8. The device according to claim 2 wherein said layers are provided by dielectric materials.

9. The device according to claim 2 wherein said layers are provided by dielectric and conductive materials.

10. The device according to claim 3 wherein said layers include at least one layer provided by PLC material.

11. The device according to claim 10 wherein additional layers of said composite layers of said flakes are of dielectric material and conductive material.

12. The device according to claim 1 wherein said plurality of layers are composed of material selected from conductive, dielectric, and PLC materials.

13. The device according to claim 12 wherein said conductive materials are selected from the group consisting of metals and oxides, and wherein said metals are selected from the group consisting of gold, silver, aluminum, and tin and said oxides include tin oxide.

14. The device according to claim 12 wherein said dielectric materials are selected from the group consisting of mica, titanium dioxide, rutile, aluminum oxide, silica and magnesium fluoride and polymers (tetrafluorethylene) (Mylar), cellophane, polyester, and polyethylene.

15. The device according to claim 12 wherein said PLC materials are selected from polymer cholesteric liquid crystalline, polymer nematic liquid crystalline, or polymer smectic liquid crystalline materials.

* * * * *